(12) United States Patent
Sankolli et al.

(10) Patent No.: US 10,783,523 B2
(45) Date of Patent: Sep. 22, 2020

(54) ALTERNATE MOBILE PAYMENT SERVICE

(71) Applicant: VISA INTERNATIONAL SERVICE ASSOCIATION, San Francisco, CA (US)

(72) Inventors: Sanjay Dattatreya Sankolli, Foster City, CA (US); Igor Karpenko, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/287,209

(22) Filed: Feb. 27, 2019

(65) Prior Publication Data
US 2019/0197557 A1 Jun. 27, 2019

Related U.S. Application Data

(63) Continuation of application No. 12/842,927, filed on Jul. 23, 2010, now abandoned.
(Continued)

(51) Int. Cl.
*G06Q 30/02* (2012.01)
*G06Q 30/00* (2012.01)
(Continued)

(52) U.S. Cl.
CPC .......... *G06Q 30/00* (2013.01); *G06Q 20/32* (2013.01); *G06Q 20/3223* (2013.01);
(Continued)

(58) Field of Classification Search
CPC .... G06Q 30/00; G06Q 20/32; G06Q 20/3223; G06Q 20/38215; G06Q 20/385; G06Q 30/0222
(Continued)

(56) References Cited

U.S. PATENT DOCUMENTS 6,163,771 A * 12/2000 Walker ................. G06Q 20/04
705/18
2001/0051915 A1 12/2001 Ueno et al.
(Continued)

FOREIGN PATENT DOCUMENTS

| KR | 20020017972 | 3/2002 |
|---|---|---|
| KR | 20030056947 | 7/2003 |
| KR | 20060034375 | 4/2006 |

OTHER PUBLICATIONS

"Off-line generation of limited-use credit card numbers", by Rubin et al. AT&T Labs—Research. P. Syverson (Ed.): FC 2001, LNCS 2339, pp. 196-209, 2002. (Year: 2002).*
(Continued)

*Primary Examiner* — William A Brandenburg
(74) *Attorney, Agent, or Firm* — Kilpatrick Townsend & Stockton LLP

(57) ABSTRACT

A system and method are described for n alternate mobile payment service. The system includes a server computer for enrolling and storing user account information. The server computer is also capable of generating a unique one-time-use identifier for use during a transaction. The one-time-use identifier is returned to user as an electronic coupon which may be in the form of a two-dimensional barcode. The coupon may be used at a merchant location to complete a transaction. When the barcode is scanned it may processed similar to a credit/debit/prepaid card payment.

24 Claims, 11 Drawing Sheets

Related U.S. Application Data

(60) Provisional application No. 61/316,663, filed on Mar. 23, 2010.

(51) Int. Cl.
*G06Q 20/32* (2012.01)
*G06Q 20/38* (2012.01)

(52) U.S. Cl.
CPC ..... *G06Q 20/385* (2013.01); *G06Q 20/38215* (2013.01); *G06Q 30/0222* (2013.01)

(58) Field of Classification Search
USPC ............... 705/14.29, 17–18, 39, 44, 325
See application file for complete search history.

(56) References Cited

U.S. PATENT DOCUMENTS

| | | | |
|---|---|---|---|
| 2008/0183590 A1* | 7/2008 | Drudis | G06Q 30/0601 705/26.42 |
| 2009/0043705 A1* | 2/2009 | Bishop | G06Q 20/108 705/42 |
| 2009/0057393 A1 | 3/2009 | Merkow | |
| 2010/0009663 A1 | 1/2010 | Chang | |
| 2010/0138344 A1* | 6/2010 | Wong | G06Q 20/10 705/44 |

OTHER PUBLICATIONS

PCT/US2011/029141, "International Search Report and Written Opinion", dated Dec. 7, 2011, 11.

* cited by examiner

ALTERNATE MOBILE PAYMENT SERVICE

The present application is a continuation application of U.S. application Ser. No. 12/842,927, entitled "Alternate Mobile Payment Device", filed Jul. 23, 2010, which is a non-provisional of and claims benefit under 35 U.S.C. § 119(e) of U.S. Provisional Patent Application No. 61/316,663, entitled "Alternate Mobile Payment Device", filed Mar. 23, 2010, the contents of which is hereby incorporated by reference in its entirety for all purposes.

BACKGROUND

Credit and debit card number theft has become an increasing problem. Fraud is even more prevalent in transaction settings, where personal payment devices such as credit and debit cards and checks, are visible to others. Card and bank account numbers can easily be stolen at merchant locations through cameras on cellular telephones. As well, card numbers can be stolen when transaction information is stolen from merchants and acquirers, who retain listing of those numbers for transactions. Finally, payment devices, such as credit and debit cards can easily be misplaced and lost, allowing others to readily utilize the number in any merchant location.

To combat such problems, some payment processors now require additional information prior to completing a transaction, such as security words, personal identification cards and PIN numbers. With the advent of new technology, also comes the demand for increased security for payment transactions.

Additionally, there exists a problem of credit card debt, budget control and insufficient funding for transactions for users. Controlling the use of these financial instruments and establishing a budget is impossible until card has been maximized or an account has be or emptied.

Embodiments of the invention address these and other problems, individually and collectively.

BRIEF SUMMARY

Embodiments of the invention are directed to methods and systems for utilizing an electronic coupon on a portable device in place of a personal a number.

One aspect of the invention is directed to a method that comprises receiving a request at a server computer, substituting user account information and user-specified parameters with a one-time-use identifier, generating an electronic coupon that contains the one-time-use identifier, and sending the one-time-use identifier to a mobile device. In an embodiment, the server computer comprises of two or more computer apparatuses. In other embodiments, the electronic coupon is in the form of a two-dimensional barcode.

Another aspect of the invention provides computer readable medium comprising code executable by a processor for implementing the aforementioned method.

In some embodiment, the electronic coupon used to fund a transaction with the primary account number. In other embodiments, the user can select one or more parameters for the one-time-use identifier, such as a specific monetary amount, a merchant category or a personal identification number (PIN). Yet in other embodiments, the electronic coupon generated from the one-time-use identifier is utilized during a transaction at a merchant location. In further embodiments, the one-time-use identifier is associated with a personal account number (PAN) of the user. In another embodiment, the transaction at a merchant location can include an indicator which defines the transaction as an electronic coupon transaction.

One embodiment provides that the request includes user-specified parameters, which can include a specific monetary amount. Another embodiment of invention provides that the electronic coupon is utilized to perform a transaction at a merchant location. A further embodiment provides that the electronic coupon is sent to the mobile device by multimedia message service (MMS) and/or electronic mail (email), or the electronic coupon is retrieved by an application installed on the mobile device. One embodiment provides that an advice message is sent to an issuer of the user account when an electronic coupon is requested.

Yet another embodiment provides that the server computer is further configured to receive an authorization request message that contains a one-time-use identifier during a transaction, access a database of users, compare information in the authorization request message with user information and one or more user-specified parameters, validate the transaction if the transaction does not violate user-specified parameters upon comparison, substitute the one-time-use identifier with an account number in the authorization request message, and send the authorization request message to an issuer. A further embodiment provides that the transaction is rejected if the transaction violates the user specified parameters.

Another aspect of the invention provides a method which comprises accessing a server computer using a user device, selecting an account to fund a transaction using the user device, wherein the account is associated with a financial instrument of the user, specifying parameters for the transaction using the user device, entering a destination for receiving an electronic coupon using the user device, and authorizing the transaction using the user device, wherein the electronic coupon is utilized in place of the financial instrument to complete the transaction. In some embodiments, the user device can be a personal computer or a mobile device. In further embodiments, the destination is a mobile device.

These and other embodiments of the invention are described in further detail below.

DETAILED DESCRIPTION

Figure 1:
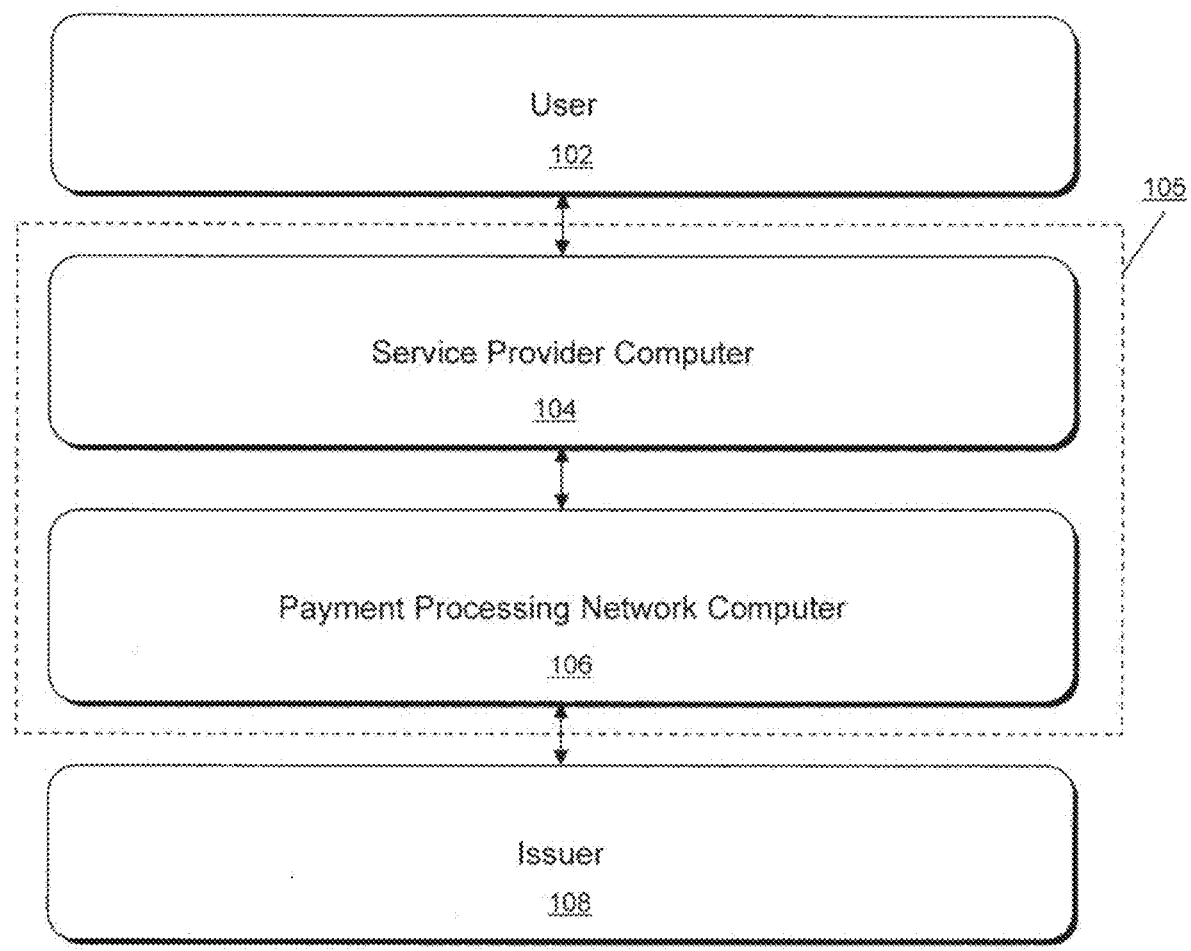
FIG. 1 shows an exemplary system that can be used in accordance with some embodiments of the invention.

Embodiments of the invention provide systems and methods for performing a payment transaction with an electronic coupon that can be used for payment to a merchant in place of a credit or debit card directly to the merchant. Such embodiments for example, aid in preventing unauthorized persons from obtaining sensitive data (e.g., account numbers) from the portable device in public locations.

Users will be able to use their mobile devices for payment at the point of sale (hereinafter "POS") of a merchant and/or perform electronic money transfer while eliminating the use of Primary Account Number (hereinafter "PAN") by the merchant and the acquirer. In the embodiments of the invention, payment transactions are still performed against the user's debit/prepaid/credit card account while available security features give the users greater control over use of the account for payments. Moreover, users are not required to have a Near Field Communication (NFC) or RFID enabled mobile device to perform electronic payment transactions with their mobile devices. Thus, the transition to payment by mobile device is facilitated as additional components will not be mandatory in the device.

In an exemplary embodiment of the invention, a user makes a request for an electronic coupon through a payment management server computer, which is the service provider, during a payment initialization process. This process may be done after enrollment is completed as will be described with reference to FIG. 2. The request is forwarded to and processed by a payment processing network such as VisaNet™ Integrated Payment (VIP) system. After processing, a unique one-time-use identifier (ID) is generated for use in place of the user's PAN. The one-time-use ID is then sent back to the payment management server computer. This one-time-use ID the electronic coupon in the form provided by the processing network, through it is not provided in such form to the user. Accordingly, once the one-time-use ID is received by the payment management server computer, a two-dimensional barcode is generated for an individual transaction. The barcode contains the one-time-use ID along with additional user-specified parameters, such as the transaction amount. The barcode can also include user information, similar to that found on a payment card's magnetic stripe. This information can include, for example, the account holder's name.

The barcode is then delivered to the user's mobile device and can be used at merchant locations for payment during a transaction. When a merchant scans the two-dimensional barcode during a transaction, an authorization request message is generated. It includes placing the one-time-use ID value into the PAN field of the authorization request message and is passing the message to an acquirer. The authorization request message may have other information including a merchant category code (MCC), an expiration date, a CVV (card verification value), a service code, etc. The acquirer then forwards the authorization request message to the payment processing network.

The payment processing network then receives the payment transaction and substitutes the one-time-use ID with the actual PAN selected by the user during payment initialization process. Furthermore, the payment processing network validates that other parameters set by the user for this transaction are satisfied (e.g., amount, Merchant Category Code (MCC), transaction expiration time/date, etc.). The modified authorization request message is then forwarded to an issuer as a regular payment card transaction with the actual PAN.

The issuer then either approves the transaction or rejects the transaction in an authorization response, dependent on the user's account. This authorization response is then sent to the payment processing network. When the authorization response is received, the payment processing network substitutes the PAN with the same one-time-use ID that was received in the authorization request message. The modified authorization response message is then sent to the acquirer and/or merchant.

In another exemplary embodiment, such as with money transfer situations, the two-dimensional barcode is delivered to another user's mobile device from the requesting user. Accordingly, the payment transaction is still performed against the requesting user's PAN, thus, giving the requesting user greater control of how (e.g., limited to groceries through MCC) and when (e.g. 3 days) money is spent by the receiver. After the receiver spends money, the requesting user sees the transaction detail on a regular credit/debit statement received from the issuer.

Exemplary systems and methods using these commands for configuring data on the portable device are provided below.

I. Exemplary Systems

A system according to an embodiment of the invention is shown in FIG. 1.

Referring to FIG. 1, a system is provided to illustrate the communication between a user and issuer when requesting an electronic coupon to be utilized during a transaction. The user initiates the communication by sending a request to a server computer 105. The server computer acts not only as a communication ink between the user and the issuer 108, but also a database where a copy of the electronic coupon, corresponding financial instrument and transaction information is stored after the coupon is generated. The electronic coupon and information relating thereto may then be referred to as needed during a transaction. Accordingly, the coupon is also generated on the server computer.

In some embodiments the server computer 106 can be composed of two separate entities including a service provider server computer 104 and a payment processing network server computer 106. In such an embodiment, the service provider server computer 104 would communicate the request to the payment processing network server computer 106 for approval. The database which is utilized to maintain a copy of the coupon and related information may be located on whichever server is generating the coupon. In other embodiments, the server computer 105 can include a single computer apparatus and need not be composed of two or more computer apparatus.

The coupon is then provided to the user for use during a transaction at a merchant location. When the user utilizes the coupon, an authorization request message is sent to the server computer 106 for approval. The server computer 105 then exchanges the coupon related information from the database and appends transaction information prior to forwarding the authorization request to the issuer 108. The issuer 108 provides an authorization response to the server computer 105, and the transaction is either approved or denied. The server computer 105 then sends the response to the merchant.

In some embodiments, an initial notification of payment initialization is sent to the issuer 108, when the user makes the request for a coupon. In other embodiment, the server computer 105 provides an approval and/or denial of the transaction to the user in addition to the merchant. The system and additional embodiments are further explained in the following methods of use. More detailed system diagrams are also provided below.

II. Exemplary Methods

Methods according to embodiments of the invention can be described with respect to FIGS. 2-8.

The methods provided herein can include a one-time-use identifier that is utilized in place of a user's personal account number during financial transaction. The one-time-use identifier can be referred to as identifier, one-time-use unique mobile transaction ID, unique ID, or any variable combination thereof. In particular, the embodiments provide the identifier to a user as an electronic coupon. The electronic coupon may be in the form of a two-dimensional (hereinafter "2-D") barcode having associated parameters for use during financial transactions at merchant locations. The barcode can be displayed on a user's mobile device and scanned by the merchant. The use of a one-time-use identifier and associated electronic coupon allow for a personal account number never to be disclosed in a public environment where potential fraud is likely to occur.

In addition, the use of the electronic coupon and associated parameters can aid in the budget of the financial transaction through the associated parameters, which can be specified prior to the transaction. In this manner, a user can account for all financial liability prior to completing a transaction and have control over spending in the marketplace. For example, if the user sets parameters such as 1) an amount of $100 that may be spent at 2) any merchant location over 3) 24 hour period, the user will be able to budget their finances accordingly.

Specific details regarding some of the above-described aspects are provided below. The specific details of the specific aspects can be combined in any suitable manner without departing from the spirit and scope of embodiments of the invention.

Figure 2:
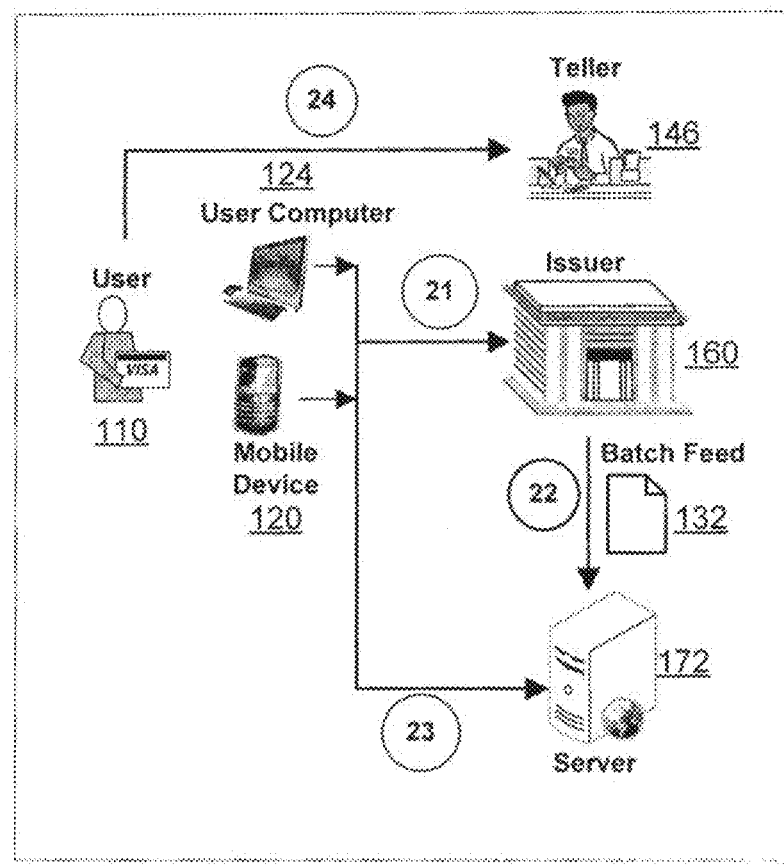
FIG. 2 shows exemplary elements in an enrollment process that can be used in accordance with some embodiments of the invention.

Referring to FIG. 2, a system and method for establishing an account with a service provider is shown. In such an embodiment, in step (21), the user 110 communicates with the issuer 160 of a payment device to indicate that they are choosing to participate in an alternate mobile payment service. The payment device may be a financial instrument, credit card, debit card, gift card, or similar type of payment option. The issuer 160 may be any type of financial institution, such as, for example, a bank. Using the user computer 124 or the mobile device 120, the user 110 may enter their name and/or a login identification and a password to use a website (not shown) operated by the issuer 160. Next, the user 110 may enter financial account information and any desired additional parameters into the website.

Parameters may include the use of a personal identification number (PIN) when completing a transaction, a merchant category code (MCC) indicating the merchant and/or type of merchant that participates in a transaction, an expiration time for completing a transaction (e.g., less than 1 week, 1 day, etc.), a set monetary amount limit (e.g., $50, $100, etc.) that may be utilized during a transaction and any additional parameters desired by the user and/or issuer. Additionally, the parameters may include recurring payments to be completed during a period of time. The user may also rutile transactions are allowed using the same coupon if monetary amount ret reached. For example, if monetary amount limit is set to $100, enabling this option will avow the user to use the same coupon for 10 transactions $10 each. These and other parameters are discussed further in following paragraphs.

In the aforementioned embodiment, the issuer 160 of the payment device is acting as the service provider of the alternate mobile payment service. In the mentioned embodiment, data relating to the payment devices enrolled in the service may then be sent to a service provider for storage and management, such as in step (22). However, it is also possible that a third party service provider may maintain a website so that it provides the alternate mobile payment service directly to the user 110, such as shown in step (23). In such an embodiment, the service provider may be in secure communication with the issuer 160 of each enrolled payment device. Accordingly, when an account associated with a payment device is enrolled in the payment service at d an electronic coupon is requested by the user 110, the service provider may provide all (e.g., amount, MCC, expiration time, etc.) or only select (e.g., amount) coupon information to the issuer 160 of that device. In another embodiment, the issuer, service provider and payment management server 172 may all be operated by the same entity (e.g. a payment processor such as Visa, Inc.). In such an embodiment, the user 110 may enroll in the service directly through that entity's website.

In a further embodiment, the user 110 may be able to enroll in the alternate mobile payment service directly through an issuing institution. For example, if Bank A issued the payment device, the user may be able to visit Bank A and enroll in the service through a teller 146 and/or other representative, such as shown in step 24. Accordingly, the user would not need a personal computer 124 to request the electronic coupon.

However, if enrollment is not performed at the issuing institution, a personal computer or similar device, may be used for completing enrollment. As shown in FIG. 2, the user computer 124 could be a personal computer, a laptop computer, a mobile device, such as a phone, PDA, etc. The user computer 124 can act as a Web client and can include a Web browser program such as Internet Explorer. Web browser programs request web pages from web server programs using the secure hypertext transport protocol (HTTPs). Web server programs running on a server computer can receive these requests and, where appropriate return corresponding web pages. The user computer can comprise a processor, and a computer readable medium coupled to the processor.

Figure 3:
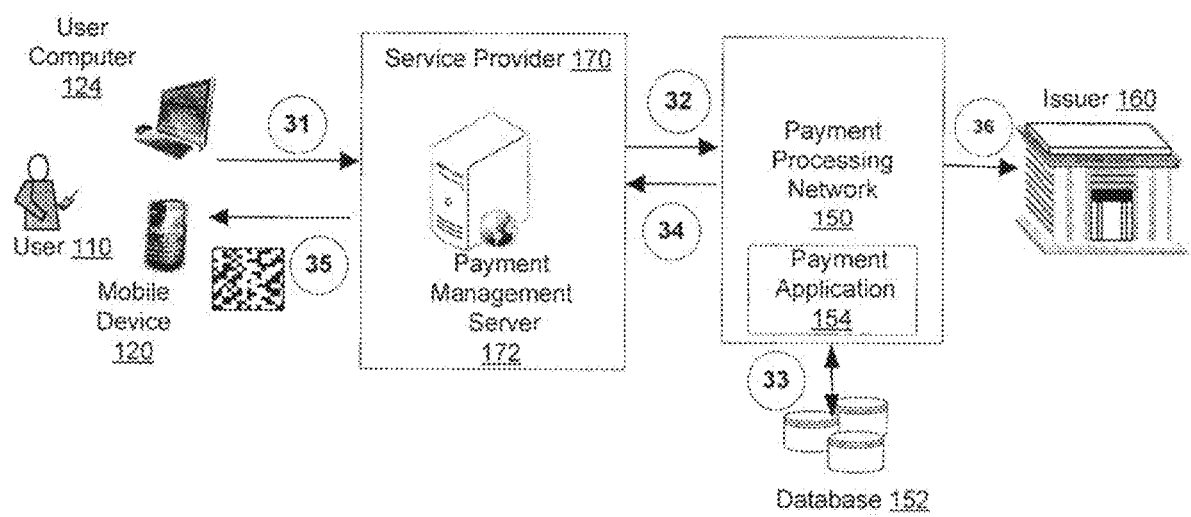
FIG. 3 shows exemplary elements in payment initialization process that can be used in accordance with some embodiments of the invention.

Referring now to FIG. 3, system and a method for requesting an electronic coupon according to an embodiment of the invention can be described. The system can include user 110 being in operative communication with both a mobile device 120, which is capable of receiving multimedia messaging (MMS) and/or electronic mail, and a user computer 124. In some embodiments, the user computer 124 and mobile device 120 can be a singular unit, having dual capabilities. As shown in step (31), the user 110 initiates communication with the service provider 170 through the user computer 124, (e.g., through a website, or an application on the computer, or an application on the mobile device). In the case of a website, the user logs into the service provider's 170 payment management server 172 through the provider's website and communicates selected parameters for the electronic coupon. The parameters may have been previously selected, in which case, the user may then only need to send the request for the coupon. Alternatively, global parameters defined by the issuer and/or service provider may be instituted if no user specified parameters are selected at the time of the request. The communication for the request can be done through a secure session, such as SSL 3.0.

Service provider 170 refers to any suitable entity that provides a web that users can use to enroll in the alternate mobile payment system and request for electronic coupons.

Payment management server computer 172 can be a powerful computer or cluster computers. For example, the server computer can be a large mainframe, a minicomputer cluster, or a group of servers functioning as a unit. Payment management server computer 172 includes a computer-readable medium (not shown) and a processor (not shown) coupled to the computer-readable medium.

The service provider 179 is also in communication with the payment processing network 150 (e.g., VisaNet™), such as shown in step (32). The payment processing network may include a payment application 154 in communication with a database 152 of user accounts, which can be utilized to generate an electronic coupon. Due to the communication between the service provider 170 and payment processing network 150, the user can check on balance and account information during a secure session through the service provider 170 website. A payment application 154 can be utilized to allow the user to perform account balance inquiries while in such a session. According, the user then can select parameters befitting of the current state of their account which they are using to fund the electronic coupon. As shown in step (33), the user's information and selected parameters are checked against the user database 152 and electronic coupon is then generated and provided back to the service provider in step (34). The electronic coupon can be in the form of a one-time-use identifier (ID) and is stored for future reference by the payment application 154 in the database 152.

Payment application 154 refers to one or more software applications stored in one or more computer readable mediums (not shown) coupled to one or more processors (not shown) and performs various operations related to facilitating an electronic payment transactions in the payment processing network 150.

The one-time-use ID is then provided by the payment processing network 150 to the service provider 170, where it is made into a two dimensional (2-D) barcode, one dimensional (1-D) barcode, or similar type of identifier. The barcode is an electronic coupon used in place of the financial instrument (e.g., credit card) during a transaction. Barcode, 2-D barcode, coupon and electronic coupon can be used interchangeably within the present disclosure. The barcode can include all the user selected parameters as well as any additional user information which can normally be found on payment instruments (e.g., name). The barcode is then communicated to the user's mobile device 120 for later use, as shown in step (35). The barcode can be communicated to the mobile device 120 via MIMS through a mobile network, such as 3G, CDMA, or via electronic mail through wireless network such as a WiFi or WLAN connection, or it can be retrieved by an app running on the mobile device.

As shown in step (36), the payment processing network 150 is also in communication with the issuer 160, in order to process the future use of the electronic coupon. However, in an additional embodiment, payment application can communicate an advice message to the issuer through the payment processing network 150 prior to use of the electronic coupon and after the initial generation of the coupon by the payment processing network 150. This allows for issuer 160 to know about the future use of the electronic coupon for payment and may allow the issuer to place a temporary hold onto the user's account for the amount of electronic coupon value, similar to how it is done for credit authorizations.

The aforementioned process will be described in further detail in the following sections.

Figure 4:
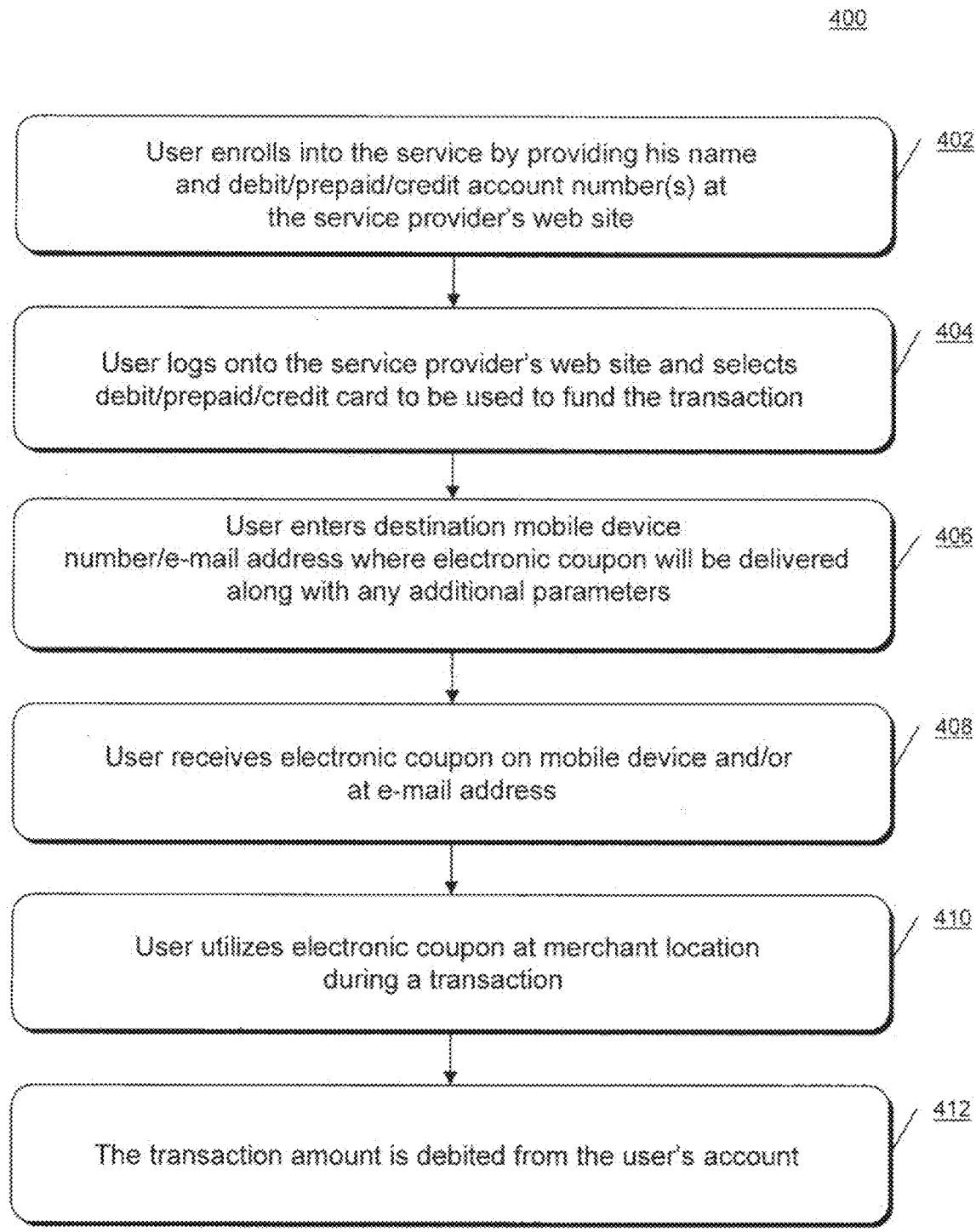
FIG. 4 shows a flow diagram illustrating a method for obtaining electronic coupon according to an embodiment of the invention.

FIG. 4 shows a flow diagram 400 for a method of requesting an electronic coupon according to one embodiment of the invention. In such an embodiment, the user 110 establishes service with a service provider on the service provider website 401. When enrolling in the service, as provided in FIG. 2, the user 110 may link the service provider 170 with personal accounts from which the user 110 wishes to fund a transaction. Alternatively, this may be accomplished upon completing a first request for the coupon. In addition, the user 110 can decide to create a username and password to store their information for later and repeated use of the service. Next, in step 402, using the user computer 124 and the mobile device 120, the user 110 logs into the service provider website which may be run on the payment management server 172. As previously mentioned, the user 110 can have an account and such security measures as a password and/or PIN can be required. The user then selects an account from which to fund a transaction. The user can have any number of accounts available on the service provider website. Such accounts can be a bank account, a checking account, credit card account, debit card account, gift card account, prepaid card account or any similar type of account which can provide funding when utilized. Once the user 110 selects the account for funding 402, the user 110 can then enter specific parameter the transaction into an appropriate website (or host site).

The parameters can include, but are not limited to, a specific monetary amount for a transaction. In addition, a parameter may be a merchant category code which can include, for instance, grocery store, book store, clothing store, etc. can be included. Other types of parameters may include a specified time for use. For example, if a user is going to a shopping center for day and only wants to spend $50.00 to purchase an item at a book store, the user can set these parameters prior to requesting the one-time-use identifier. Accordingly, if the user goes to the shopping mall, the barcode may only be used at a bookstore for up to $50 and may expire at the end of the day.

In addition to selecting an account for funding 402 and parameters for the transaction 406, the user 110 can also enter the destination e-mail and/or mobile device number where an MMS message containing the barcode can be sent. In one embodiment, when the user enrolls in the service, these numbers and/or email may be entered and selected by default if no additional and/or new number or email is entered. The user 110 may also wish to send a copy of the electronic, coupon, or barcode, to both email and via MMS. Alternatively, the user 110 may wish to send the electronic coupon to another person, such as for a charitable donation or money transfer. Accordingly, this option is made available through the service provider 170 website as the charges can be made against the sending user's account and the barcode is sent to another user's, mobile device. Regardless of whom receives the electronic coupon, parameters can be selected by the funding user for restricting the use of the coupon.

Next, in step 408, the user 110 or receiver of the electronic coupon, receives an email and/or MMS containing a 2-D barcode which can be displayed on the display of their mobile device 120. The user 110 can then display the barcode at a merchant location to complete a transaction 410. However, the user 110 can use the electronic coupon within the pre-defined parameters which were specified during the payment initialization in step 406. If such parameters are met during the transaction, the transaction amount will be debited from the user's account as shown in step 412. The amount does not need to be the exact and full amount specified, only within at or below the specified amount. However, if the user 110 does not use the electronic coupon in the pre-defined parameters, the transaction will not be approved. For example, if the user sets a parameter of $20 at a merchant location such as a grocery store and then attempts to use the electronic coupon to purchase an item at a clothing store for $40, the transaction will be denied. In another embodiment, the user 110 can set a one-time PIN for the transaction. If the PIN is not entered correctly during the transaction, the transaction will be denied. In one embodiment, additional costs for taxes (e.g., 15% of transaction amount) can be automatically factored into the transaction by the payment processing network 150 to adjust for costs not considered by the user during the payment initialization process. Accordingly, if all parameters are met and the cost is 15% above that originally set by the user, the transaction will still be approved through the payment processing network 150.

In an alternate embodiment, the user computer 124 may also be the mobile device 120, such as a PDA and/or Smartphone, which has access to the Internet. In such an embodiment, the user's mobile device 120 may include an application for accessing the service provider's website. Accordingly, the user may open the application, enter the payment device (e.g., debit/credit/prepaid card) information and select the transaction parameters. The application may the communicate the entered information to the service provider website and/or directly to the payment management server in order to request an electronic coupon. In one embodiment, the user's phone number and/or email associated with the mobile device 120 is also appended to the information. In the aforementioned embodiment, the electronic coupon is returned to the user's mobile device 120 through MMS or e-mail either directly to the user's phone and/or through the application, and may be utilized at a merchant location to complete a transaction. In another embodiment, the user enters a different recipient as the destination mobile device email and/or phone number (e.g., through MMS) for the electronic coupon. In this embodiment, the user may receive an e-mail or MMS notification message, through the application or directly on the mobile device, when the electronic coupon is sent to the recipient and/or utilized by the recipient during a transaction. The application on the user's mobile device may include additional features such as copes of transaction during a specified time period, monthly spending amounts, and any other information desirable to the user.

Figure 5:
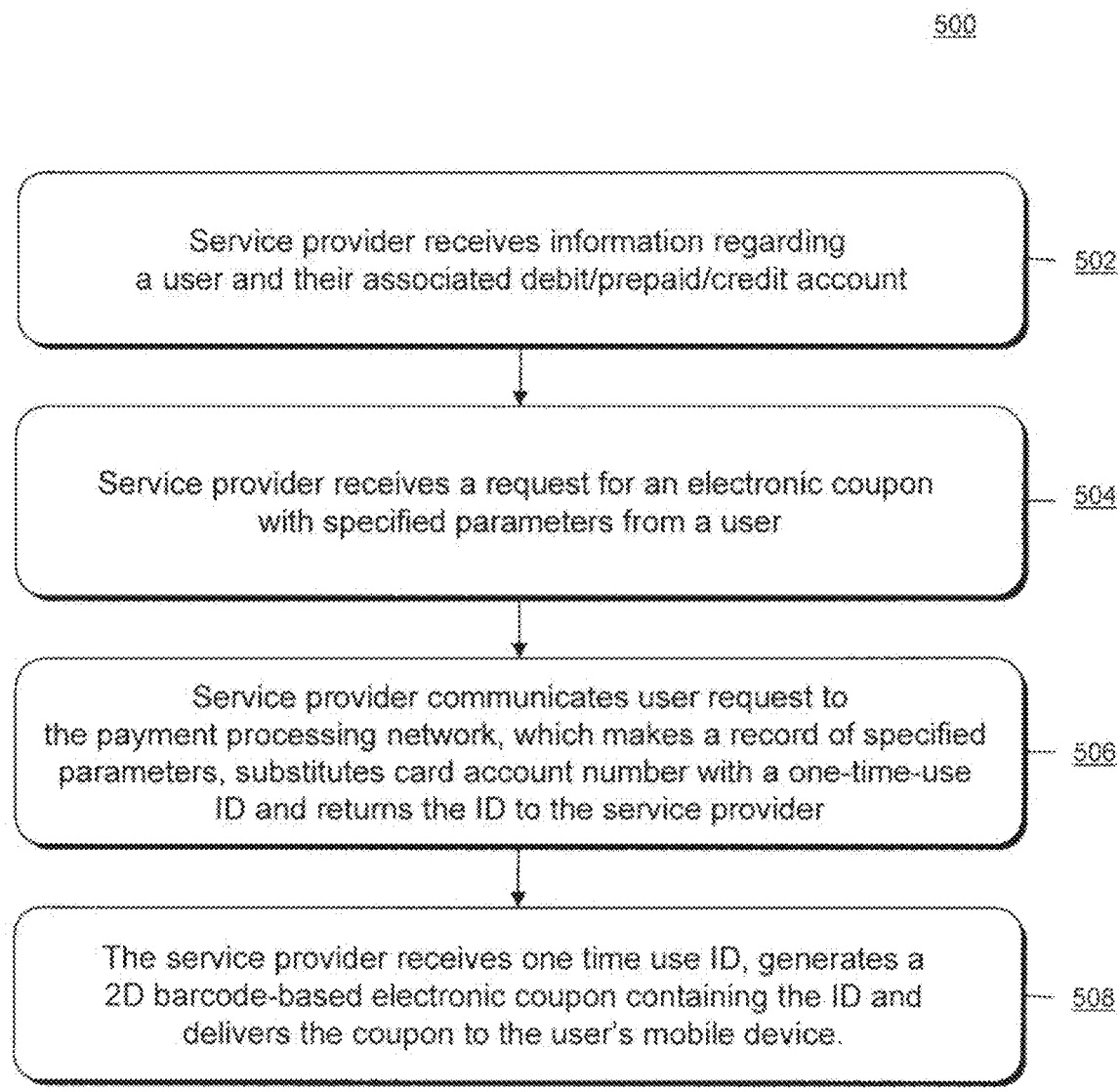
FIG. 5 shows a flow diagram illustrating a method for providing an electron coupon according to an embodiment of the invention.

FIG. 5 shows a flow diagram 500 of a method for providing an electronic coupon by a service provider according to one embodiment of the invention. The service provider, which can include a payment management server 172, receives information regarding a user, the user account and user preferences, or parameter in step 502. The user 110 can set global parameters for use with all transactions, which are overridden only when other parameters are manually entered. For instance, the user 110 can always decide to have electronic coupons expire within a 24 hour period as well as always being delivered via MMS to a specified mobile device number. However, if another time is entered for an individual transaction, such as a week prior to expiration and additional mobile numbers for delivery, these parameters will override the default, or global parameters previously established for the individual transaction. The default parameters will then be applied to all future transactions less modified. The service provider 170 can also have global parameters set for all user accounts upon enrollment in order to ensure electronic coupon security, such as expiration after 30 days, etc.

The service provider 170 then receives a request for a transaction from the user during a payment initialization process in step 504. The request contains all parameters and user account information.

In step 506, the service provider 170 forwards the request and all associated information to a payment processing network 150 as shown. The payment processing network 150 receives the request and generates a one-time-use identifier for the transaction. The identifier can be in the form of numbers, letters or a combination thereof. Furthermore, the identifier can be copied and stored in a database at the payment processing network, along with all information associated with the transaction received in the initial request. The one-time-use identifier is then communicated back to the service provider 170 from the payment processing network 150.

In step 508, the service provider 170 receives the one-time-use identifier and generates a two-dimensional barcode in its place. The 2-D barcode contains the one-time-use identifier and can include additional information associated with the service provider 170, payment processing network 150 and/or issuer 160 for use during a transaction. For instance, the barcode can include information identifying the transaction as a credit card transaction, including the card authorization or, a debit card transaction, including the full financial transaction. This additional information then may be used by the merchant helping to construct a payment transaction.

The barcode can be sent via MMS or email to the user's mobile device 120, or to another mobile device recipient selected by the user 110.

Figure 6:
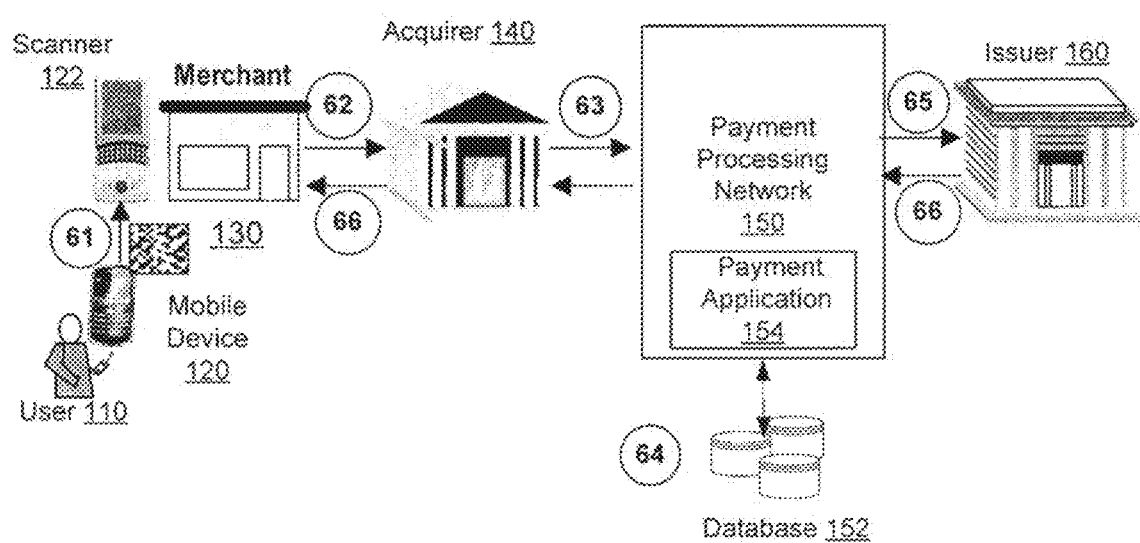
FIG. 6 shows exemplary elements in the payment flow during a transaction that can be used in accordance with some embodiments of the invention.

FIG. 6 shows an exemplary system and method for performing an electronic payment transaction using the electronic coupon. In addition to the elements shown in FIG. 3. FIG. 6 includes a merchant 130, a scanner 122 at the merchant location, and acquirer 140.

In step (61) of FIG. 6, the user 110 communicates with an access device, such as a scanner 122 at the merchant 130 location using the mobile device 120 having an electronic coupon. The scanner 122 reads the 2-D barcode into the merchant computer (not shown) which communicates the one-time-use ID to the acquirer 140. Accordingly, the merchant 130 is in communication with acquirer 140 as shown in step (62).

The scanner 122, can be any suitable access device for communicating with merchant 130 and for interacting with mobile device 120. Scanner and access device can be utilized interchangeably. Scanner 122 can be in any suitable location such as at the same location as merchant 130. Scanner 122 can be in any suitable form. Some examples of access devices 132 include point of sale (POS) terminal devices, camera-enabled personal computers (PCs) and mobile telephones, hand-held specialized readers, etc. Scanner 122 can use any suitable contact or contactless mode of operation to send or receive data from mobile device 120.

The scanner 122 can be included in a POS terminal. A POS terminal may include a payment device reader, a processor, a networking interface, and a computer-readable medium, all operatively coupled together. Exemplary scanners can include one or more of radio frequency (RF)

antennas, optical scanners, bar code readers, magnetic stripe readers, etc. Such scanners may interact with mobile device 120.

A user 110 refers to an individual or organization such as business that is capable of purchasing goods or services or making any suitable payment transaction with merchant 130.

A merchant 130 refers to any suitable entity or entities that make a payment transaction with the user 110. The merchant 130 can use any suitable method to make the payment transaction. For example, a merchant 130 can use an e-commerce business to allow the payment transaction to be conducted by the merchant 130 and the user 110 through the Internet. Other examples of a merchant 130 include a department store, a gas station, a drug store, a grocery store, or other suitable business. In case of an e-commerce type of business, the user 110 may e-mail the electronic coupon to the merchant 130 or attach the electronic coupon during the "check out" process at the merchant 130 web site to be scanned at a later time.

Figure 9:
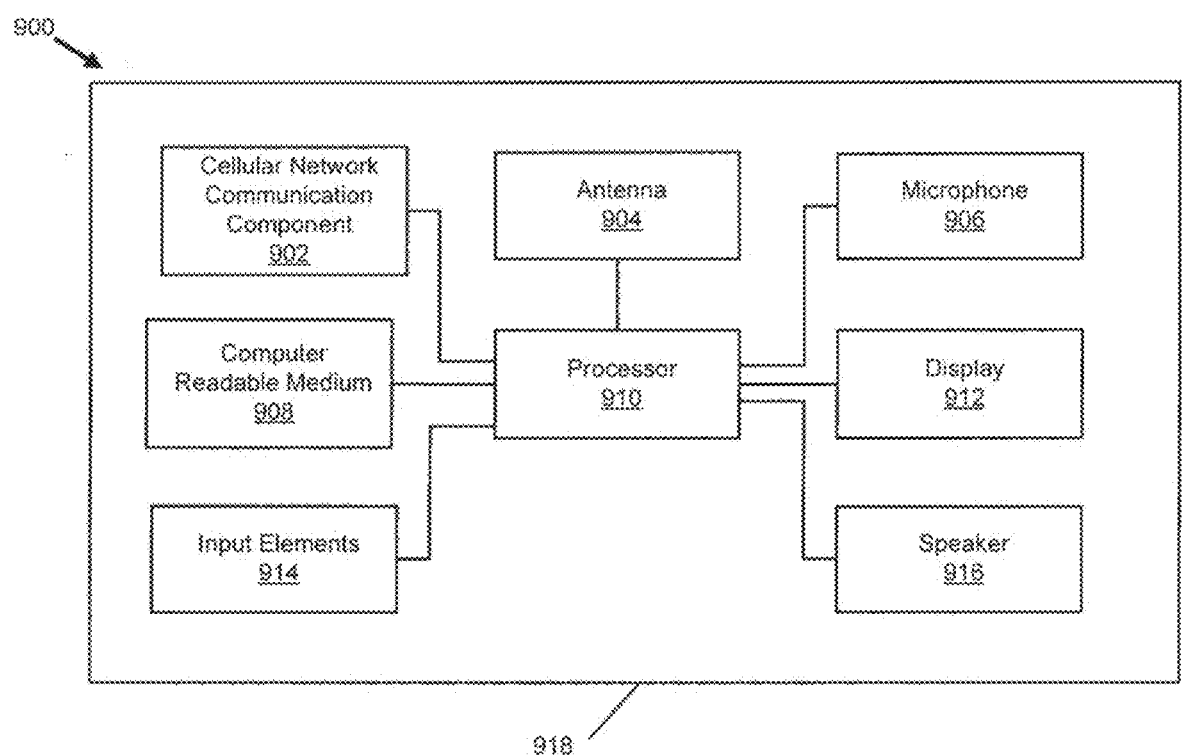
FIG. 9 shows block diagram of a portable device.

Mobile device 120 can be in any suitable form. For example, suitable mobile devices 120 can be hand-held and compact so that they can fit into a consumer's wallet and/or pocket (e.g., pocket-sized). Some examples of mobile device 120 include desktop or laptop computers, cellular phones, personal digital assistants (PDAs), pagers, payment cards, security cards, access cards, smart media, transponders, and the like. In some embodiments, mobile device 120 and portable consumer device 112 are embodied in the same device. An exemplary mobile device is illustrated in FIG. 9 and further described in section II.

Scanner 122 is an electronic device used by merchant 130 at the Point of Sale (POS) to scan the barcodes of merchandise and coupons.

Acquirer 140 refers to any suitable entity that has an account of the merchant 130. In some embodiments, issuer 160 can also be acquirer 140.

Next, in step (63), the acquirer 140 communicates the one-time-use ID and other parameter values pertaining to the purchase (e.g., transaction amount, merchant category code, etc.) to the payment processing network 150, where the transaction characteristics are checked against the parameters associated with the one-time-use ID and stored in the database 152, shown in step (64). If the parameters are not violated, the payment processing network 150 substitutes the user's 110 account number from the database 152 for the one-time-use ID and forwards the transaction to the issuer 160 for approval, shown in step (85).

In FIG. 6 and also in FIG. 3, the payment processing network 150 refers to a network that is configured to process credit and debit card transactions. The payment processing network 150 can have or operate a server computer and a include a database. The database can include any hardware, software, firmware, or combination of the preceding for storing and facilitating retrieval of information. Also, the database can use any of a variety of data structures, arrangements, and compilations to store and facilitate retrieval of information. The server computer can be coupled to the database and can include any hardware, software, other logic, or combination of the preceding for servicing the requests from one or more client computers. The server computer can comprise one or more computational apparatuses and can use any of a variety of computing structures, arrangements, and compilations for servicing the requests from one or more client computers.

The payment processing network 150 can include data processing subsystems, networks, and operations used to support and deliver authorization services, exception file services, and clearing and settlement services. An exemplary payment processing network 150 can include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system which performs clearing and settlement services. The payment processing network 150 can use any suitable wired or wireless network, including the Internet.

Database 152, which can be also referred to as the cardholder database, can be the form of one or more server computers for storage of data. It can also be in the form of one or more electronic storage units (stand alone hard drives) capable of storing electronic data. In some embodiments database 152 can be housed by the payment processing network 150.

Issuer 160 refers to any suitable entity that can open and maintain an account associated with credit/debit/prepaid card for user 110. Some examples of issuers can be a bank, a business entity such as a retail store, or a governmental entity. In many cases, issuer 160 can also issue the credit/debit/prepaid card to user 110.

Finally, in step (66) if the issuer 160 approves the transaction, the approval message (in the form of an authorization response message) returns to the payment processing network 150, where the user's account number is again substituted for the one-time-use ID. The approval message for the one-time-use ID is then sent back to the merchant through the acquirer 140. Alternatively, the payment processing network 150 can provide the approval message directly to the merchant 130.

Figure 7:
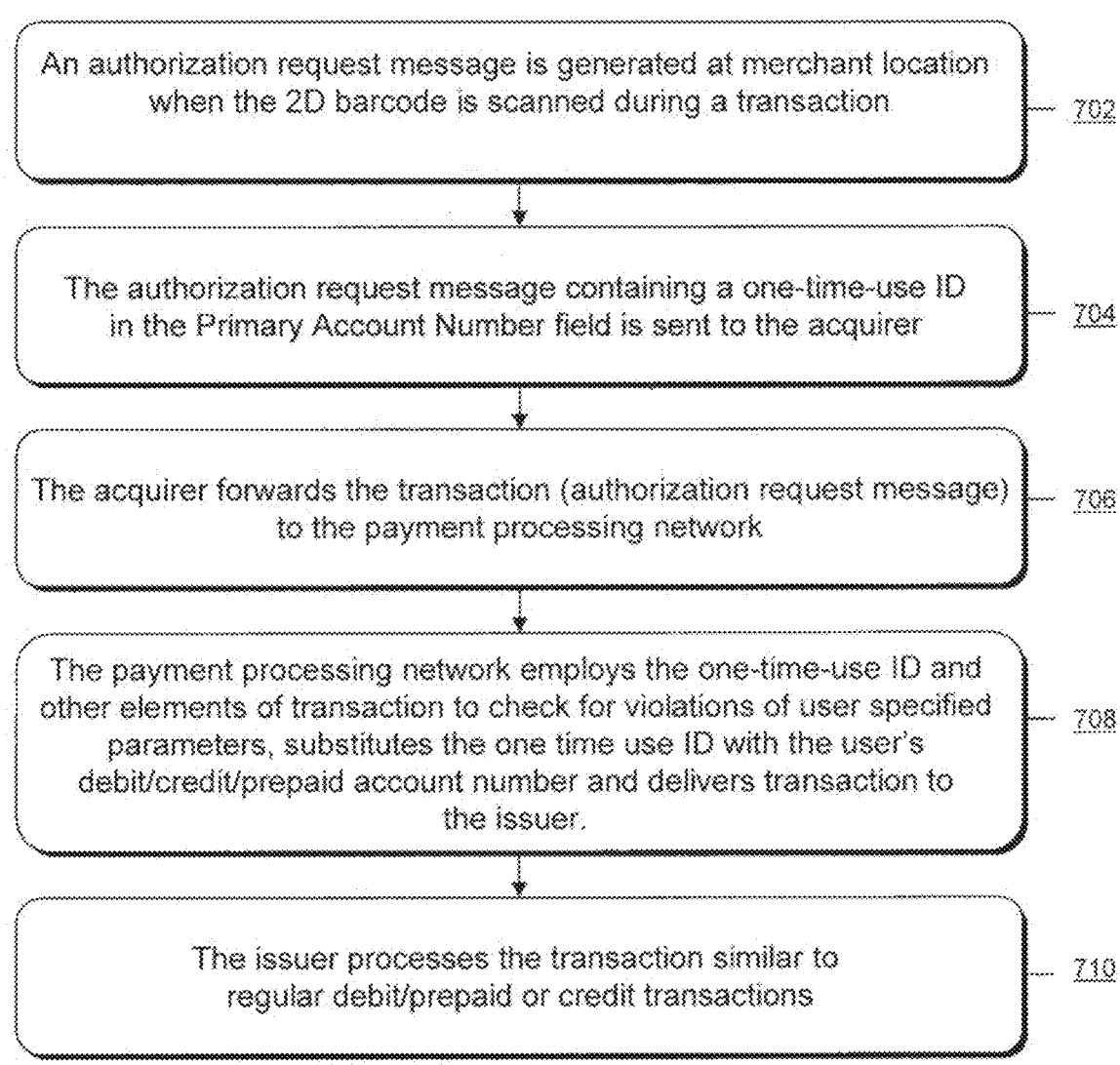
FIG. 7 shows a flow diagram illustrating a method for completing a transaction with an electronic coupon according to an embodiment of the invention.

Referring now to FIG. 7, a flow diagram 700 of the method for using the electronic coupon at a merchant location and completing a transaction is illustrated. In such an embodiment, the user presents the barcode at a merchant location where it is scanned. The merchant can use a wireless or hardwired scanner which communicates with a merchant register and the network. In step 702, the merchant register, such as a computer, generates an authorization request, similar to those generated during credit/debit/prepaid card MagStripe™ transactions.

In step 704, the authorization request message is sent to an acquirer 140 for approval. The authorization request message includes all information regarding the transaction along with the one-time-use ID in place of the user's PAN. The acquirer 140 then forwards the authorization request message to the payment processing network 150 for processing and approval in step 706. In one embodiment, the authorization request message can include an additional indicator appended during the transaction which identifies the transaction as an alternate mobile payment service transaction (e.g., barcode) through a service provider. Accordingly, when the authorization message is received, the payment processing network can handle the transaction more efficiently.

Once the transaction is identified as are alternate mobile payment transaction by the payment processing network, the payment processing network 140 then checks the transaction type, amount, location, etc. with the pre-defined parameters for the transaction. The payment processing work retrieves this information from a database which includes a record of the one-time-use ID and the associated parameters. In step 708, if none of the parameters are violated, the payment processing network 140 then substitutes the one-time-use ID with the user's personal account number and forwards the authorization request message to the issuer 160 of the PAN. However, it any of the parameters are violated, the payment processing network 150 will reject request for authorization and the transaction will be denied.

In step 710, the issuer 160 processes the transaction as a regular debit/credit/prepaid card transaction with the user's PAN. The issuer 160 checks the user's account standing for sufficient funding, and either authorizes or rejects the transaction through a positive or negative acknowledgement to the authorization request message which is returned to the payment processing network. When the payment processing network receives the aforementioned acknowledgement, the one-time-use ID for the transaction is again substituted for the user's PAN and the issuer's response message indicating approval or denial of the transaction is provided back to the acquirer for delivery to the merchant. Alternatively, the payment processing network 150 can directly provide the response to the merchant 130.

Figure 8:
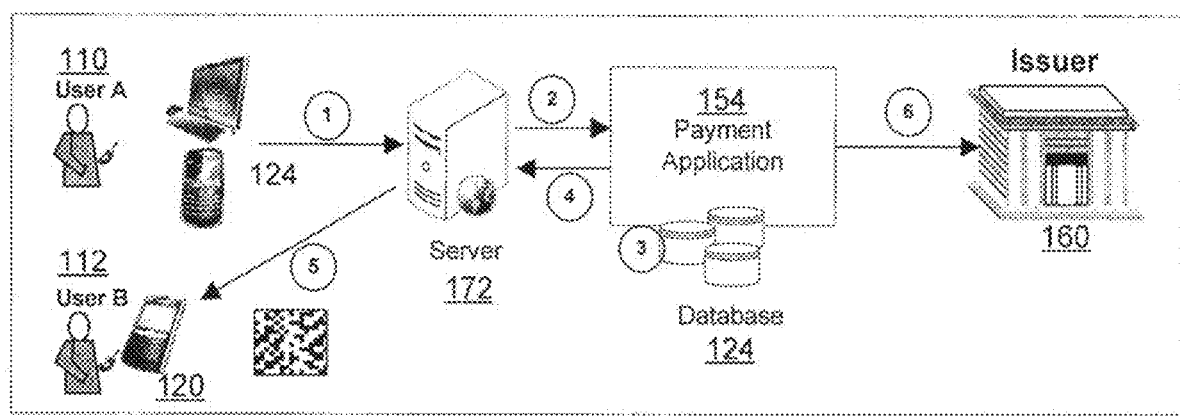
FIG. 8 shows exemplary elements in payment initialization process that can be used in accordance with some embodiments of the invention.

Next, referring to FIG. 8, another embodiment for requesting an electronic coupon is described. Similar to FIG. 3, in step (1), user A 110 logs into the service provider's website and through a user device 124 to request an electronic coupon. However, during this time, the user A 110 may specify a parameter for the destination address to be for a different user, such as user B 112. In step (2), the request is then processed through the service provider server computer 172 and the information and parameters are communicated to the payment processing server computer for approval from issuer 160 in step (6). Then, the payment application 154 generates the one-time-use ID in step (4) and it is stored in the database 124 in step (3), similar to that described within FIG. 3. When the electronic coupon is the delivered to the service provider where the two-dimensional barcode is generated, the service provider server computer 172 forwards the barcode to the destination address of the mobile device 120 of user B 112 for use during a transaction, as shown in step (5). In such an embodiment, the parameters related to the electronic coupon may also be communicated to the mobile device 120 of user B 112, in order for those parameters to be correctly met during the transaction. User B may then use the coupon as described above, to conduct payment transaction.

III. Exemplary Portable Devices Access Devices and Computer Apparatuses

The mobile device according to embodiments of the invention can be in any suitable form. A mobile device can be referred to interchangeably as a mobile phone or portable device within the disclosure. Suitable mobile devices can be hand-held and compact so that they fit into a consumer's pocket (e.g., pocket-sized). They can include any consumer payment device that has one or both of multi-media messaging (MMS) and electronic mail (e-mail) capabilities. Accordingly, the mobile device can include one or more communication interfaces such as a cellular communication interface and wireless local area network/WiFi interface, etc. Accordingly, examples of portable devices include cellular phones, personal digital assistants (PDAs), and the like.

In an exemplary embodiment, FIG. 9 shows a block diagram of components in a mobile device in the form of a cellular or mobile communication device that can be used in embodiments of the invention. The exemplary wireless phone 900 can comprise a computer readable medium 908, a cellular network communication component 902 and a body 918. The computer readable medium 908 can be present within the body 918, or can be detachable from it. The cellular network component 902 can act as a communication interface to receive the electronic coupon on the mobile device. The body 918 can be in the form a plastic substrate, housing, or other structure. The computer readable medium 908 can be in the form of (or can be included in) a memory that stores data (e.g., issuer account numbers and other elements of split payment data) and can be in any suitable form including a memory chip, etc. The memory preferably stores information such as the electronic coupon and applications which control the communication with the service provider and other functions within the device. In the case where the mobile device 900 acts also as the user computer, the device memory can store financial information can include information such as bank account information, a bank identification number (BIN), credit or debit card number information, account balance information, expiration date, consumer information such as name, date of birth, etc. Any of this information can be transmitted by the phone 900.

The phone 900 can also include a processor 910 (e.g., a microprocessor) for processing the functions of the phone 900 and a display 912 to allow a user to display the electronic coupon at a merchant location. The phone 900 may further include input elements 914 to allow a user to input information into the device, a speaker 916 to allow the consumer to hear voice communication, music, etc., and a microphone 906 to allow the user to transmit her voice through the phone 908. The phone 900 can also include an antenna 904 for wireless data transfer (e.g., data transmission).

Figure 10:
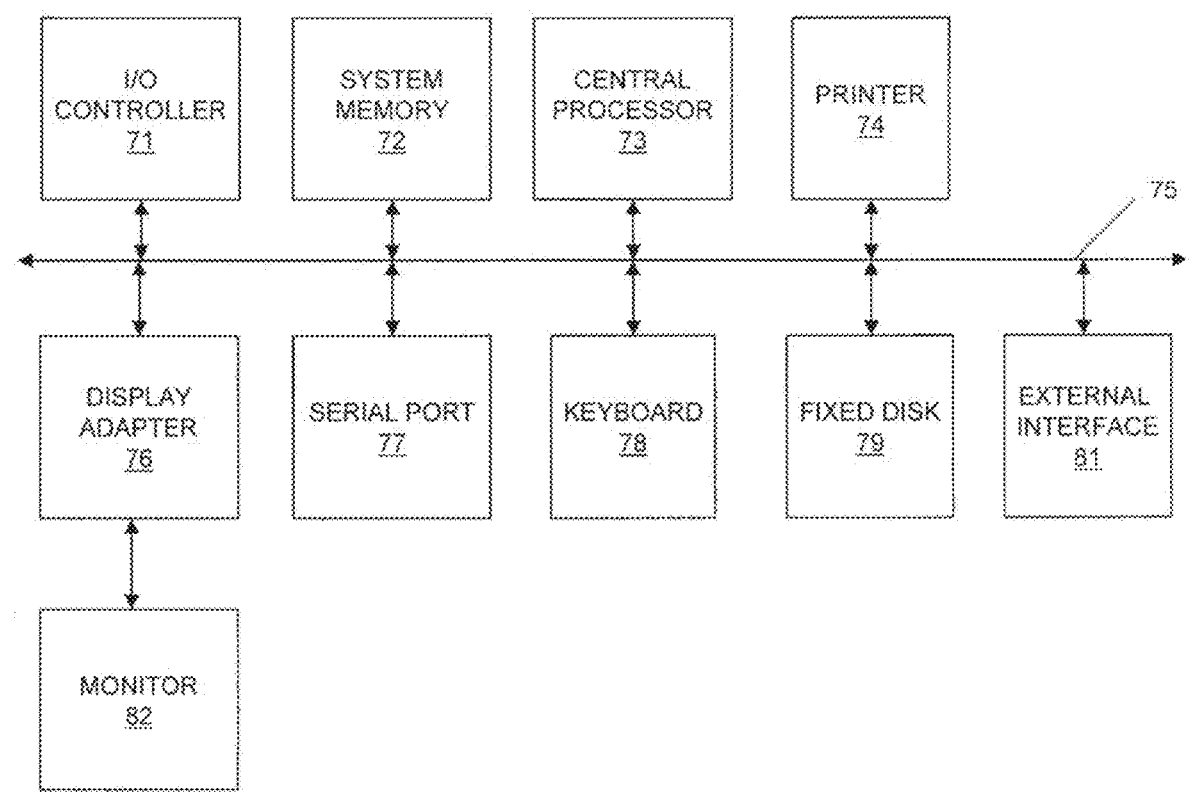
FIG. 10 shows a block diagram of exemplary components for use within the systems of FIGS. 1-8.

Referring now to FIG. 10 the various participants and elements (e.g., the issuer 160, the payment processing network 150, the payment management server computer 172, the merchant 130, the acquirer 140, and the user computer 124) in FIGS. 1-3, 6,8, can operate one or more computer apparatuses (e.g., a server computer) to facilitate the functions described herein. Any of the elements in FIGS. 2, 3,6,8 can use any suitable number of subsystems to facilitate the functions described herein. Examples of such subsystems or components are shown in FIG. 10. The subsystems shown FIG. 10 are interconnected via a system bus 75. Additional subsystems such as a printer 74, keyboard 78, fixed disk 79 (or other memory comprising computer readable media), monitor 82, which is coupled to display adapter 76, and others are shown. Peripherals and input/output (I/O) devices, which couple to I/O controller 71, can be connected to the computer system by any number of means known in the art, such as serial port 77. For example, serial port 77 or external interface 81 can be used to connect the computer apparatus to a wide area network such as the Internet, a mouse input device, or a scanner. The interconnection via system bus allows the central processor 73 to communicate with each subsystem and to control the execution of instructions from system memory 72 or the fixed disk 79, as well as the exchange of information between subsystems. The system memory 72 and/or the fixed disk 79 can embody a computer readable medium.

Figure 11:
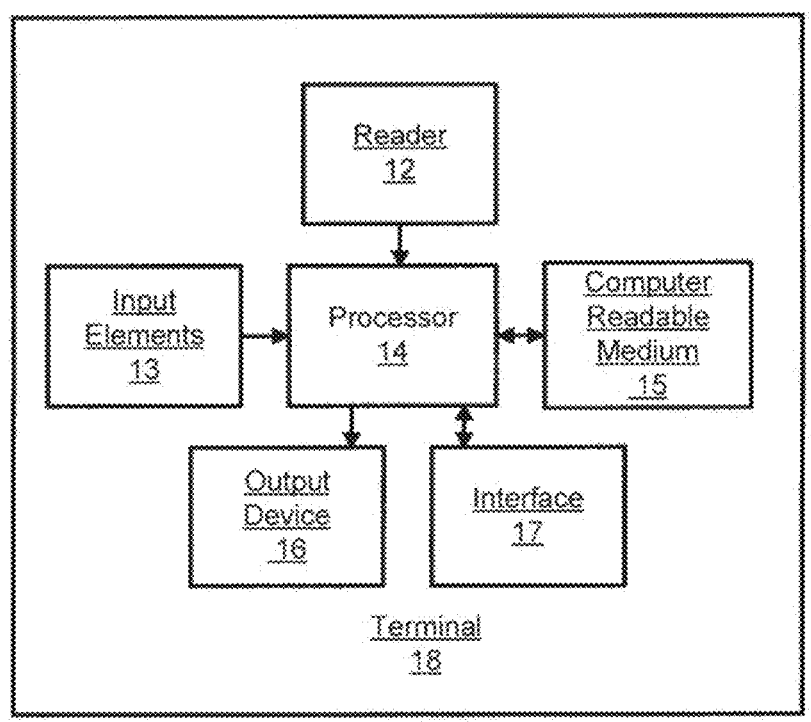
FIG. 11 shows a block diagram of an access device.

Referring now to FIG. 11, a block diagram of an terminal 18, which can be s scanner is illustrated according to an embodiment of the invention. Access device can be utilized interchangeably with access device or terminal, point of sale (POS) device or terminal, reader and terminal within the present disclosure. The terminal 18 comprises a processor 14 operatively coupled to a computer readable medium 15 (e.g., one or more memory chips, etc.), input elements 13 such as buttons or the like, one or more readers 12 (e.g., a barcode reader, optical scanner, etc.), an output device 16 (e.g., a display, a speaker, etc.) and an interface 17. A housing can house one or more of these components. The computer readable medium 15 can comprise instructions or code, executable by a processor. The interface can be a wired or wireless interface capable of communication with the merchant register. In another embodiment, interface 17 can be a network interface for direct communication with an acquirer.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, can be implemented as software code to be executed by a processor using any suitable computer language such as, for example, Java, C++ or Perl using, for example, conventional or object-oriented techniques. The software code can be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium can reside on or within a single computational apparatus, and can be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment can be combined with one or more features of any other embodiment without departing from the scope of the invention.

A recitation of "a" or "the" is intended to mean "one or more" unless specifically indicated to the contrary.

What is claimed is:

1. A method comprising:
   prior to initiation of a transaction:
   receiving, at a server computer, information related to a user and an associated user account identifier associated with a user account;
   receiving, at the server computer, a request for an electronic coupon, wherein the request includes user account information and one or more user-specified parameters for the electronic coupon;
   storing, in a database of users, the one or more user-specified parameters, wherein the one or more user-specified parameters are pre-defined by the user;
   determining, by the server computer, one or more global parameters, wherein the one or more global parameters are determined by a service provider, an issuer, or a payment processing network;
   generating, by the server computer, the electronic coupon in form of a two-dimensional barcode based on the one or more user-specified parameters and the one or more global parameters, wherein the electronic coupon contains a one-time-use identifier;
   sending, from the server computer, the electronic coupon to a mobile device, thereby enabling the mobile device to conduct one or more payment transactions using the electronic coupon, wherein the electronic coupon transforms the mobile device from being unable to conduct the one or more payment transactions into a payment device;
   upon initiation of the transaction:
   receiving, at the server computer, an authorization request message that contains the one-time-use identifier during the transaction from a merchant;
   accessing and searching, by the server computer, the database of users;
   identifying the one or more user-specified parameters associated with the electronic coupon through the one-time-use identifier stored in the database of users;
   determining, by the server computer, the one or more global parameters associated with the electronic coupon;
   comparing, by the server computer, transaction information in the authorization request message with the one or more user-specified parameters and the one or more global parameters;
   validating, by the server computer, the transaction when the transaction does not violate any of the one or more user-specified parameters or the one or more global parameters upon comparison;
   substituting, by the server computer, the one-time-use identifier with the associated user account identifier in the authorization request message;
   transmitting, from the server computer, the authorization request message comprising the user account identifier to the issuer of the user account, the issuer being separate and distinct from the server computer, wherein the issuer authorizes the transaction and generates a response message comprising an indication that the transaction has been authorized;
   receiving the response message comprising the indication from the issuer;
   substituting, by the server computer, the one-time-use identifier for the user account identifier in the response message;
   transmitting, from the server computer, the response message with the one-time-use identifier to the merchant; and
   performing, by the server computer, a settlement process for the transaction after transmitting the response message to the merchant.

2. The method of claim 1, wherein the mobile device belongs to the user, thereby enabling the user to use the electronic coupon to conduct the one or more payment transactions.

3. The method of claim 1, wherein the mobile device belongs to a recipient specified by the user, thereby enabling the recipient to use the electronic coupon to conduct the one or more payment transactions.

4. The method of claim 1, wherein the one or more user-specified parameters or the one or more global parameters includes a specified monetary amount, wherein the electronic coupon is used to perform one or more electronic payment transactions totaling less than or equaling to the specified monetary amount.

5. The method of claim 1, wherein the one or more user-specified parameters or the one or more global parameters include a specified time period of operability.

6. The method of claim 1, wherein the one or more user-specified parameters include a merchant category where the electronic coupon is valid for the transaction.

7. The method of claim 1, wherein the one or more user-specified parameters include a personal identification number (PIN) to be utilized to complete the transaction.

8. The method of claim 1, wherein the sending the electronic coupon to the mobile device is performed through an application installed on the mobile device, wherein the electronic coupon is stored for future transactions by the application.

9. The method of claim 1, wherein the authorization request message comprises an indicator which identifies the transaction as an electronic coupon transaction.

10. The method of claim 1, further comprising:
transmitting an advice message to the issuer of the user account indicating a transaction initialization process.

11. The method of claim 1, wherein the authorization request message comprises a merchant category code, an expiration date, and a service code.

12. The method of claim 11, wherein the user account identifier is a primary account number.

13. The method of claim 12, wherein the primary account number is associated with a credit card number.

14. The method of claim 1, wherein the authorization request message is received from the merchant at the server computer via an acquirer, wherein the server computer is in the payment processing network.

15. A server computer comprising a processor and a non-transitory computer-readable medium, the non-transitory computer-readable medium storing executable code which when executed by the processor implements a method, the method comprising:
prior to initiation of a transaction:
receiving, at the server computer, information related to a user and an associated user account identifier associated with a user account;
receiving, at the server computer, a request for an electronic coupon, wherein the request includes user account information and one or more user-specified parameters for the electronic coupon;
storing, in a database of users, the one or more user-specified parameters, wherein the one or more user-specified parameters are pre-defined by the user;
determining, by the server computer, one or more global parameters, wherein the one or more global parameters are determined by a service provider, an issuer, or a payment processing network;
generating, by the server computer, the electronic coupon in form of a two-dimensional barcode based on the one or more user-specified parameters and the one or more global parameters, wherein the electronic coupon contains a one-time-use identifier;
transmitting, from the server computer, the electronic coupon to a mobile device, thereby enabling the mobile device to conduct one or more payment transactions using the electronic coupon, wherein the electronic coupon transforms the mobile device from being unable to conduct the one or more payment transactions into a payment device;
upon initiation of the transaction:
receiving, at the server computer, an authorization request message that contains the one-time-use identifier during the transaction from a merchant;
accessing and searching, by the server computer, the database of users;
identifying the one or more user-specified parameters associated with the electronic coupon through the one-time-use identifier stored in the database of users;
determining, by the server computer, the one or more global parameters associated with the electronic coupon;
comparing, by the server computer, transaction information in the authorization request message with the one or more user-specified parameters and the one or more global parameters;
validating, by the server computer, the transaction when the transaction does not violate any of the one or more user-specified parameters or the one or more global parameters upon comparison;
substituting, by the server computer, the one-time-use identifier with the associated user account identifier in the authorization request message;
transmitting, from the server computer, the authorization request message comprising the user account identifier to the issuer of the user account, the issuer being separate and distinct from the server computer, wherein the issuer authorizes the transaction and generates a response message comprising an indication that the transaction has been authorized;
receiving the response message comprising the indication from the issuer;
substituting, by the server computer, the one-time-use identifier for the user account identifier in the response message;
transmitting, from the server computer, the response message with the one-time-use identifier to the merchant; and
performing, by the server computer, a settlement process for the transaction after transmitting the response message to the merchant.

16. The server computer of claim 15, wherein the mobile device belongs to the user, thereby enabling the user to use the electronic coupon to conduct the one or more payment transactions.

17. The server computer of claim 15, wherein the mobile device belongs to a recipient specified by the user, thereby enabling the recipient to use the electronic coupon to conduct the one or more payment transactions.

18. The server computer of claim 15, wherein the one or more user-specified parameters or the one or more global parameters includes a specified monetary amount, wherein the electronic coupon is used to perform one or more electronic payment transactions totaling less than or equaling to the specified monetary amount.

19. The server computer of claim 15, wherein the one or more user-specified parameters or the one or more global parameters includes a specified time period of operability.

20. The server computer of claim 15, wherein the one or more user-specified parameters includes a merchant category where the electronic coupon is valid for the one or more payment transactions.

21. The server computer of claim 15, wherein the one or more user-specified parameters include a personal identification number (PIN) to be utilized to complete the one or more payment transactions.

22. The server computer of claim 15, wherein the transmitting the electronic coupon to the mobile device is performed through an application installed on the mobile device wherein the electronic coupon is stored for future transactions by the application.

23. The server computer of claim 15, wherein the authorization request message comprises an indicator which identifies the transaction as an electronic coupon transaction.

24. The server computer of claim 15, wherein the method further comprises:

transmitting an advice message to the issuer of the user account indicating a transaction initialization process.

* * * * *